(12) United States Patent
Li et al.

(10) Patent No.: US 12,414,090 B2
(45) Date of Patent: Sep. 9, 2025

(54) RESOURCE INDICATION METHOD, RESOURCE DETERMINING METHOD, AND RELATED APPARATUS

(71) Applicant: Huawei Technologies Co., Ltd., Shenzhen (CN)

(72) Inventors: Chao Li, Beijing (CN); Fan Yang, Beijing (CN); Lili Zhang, Beijing (CN); Haining Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 17/887,102

(22) Filed: Aug. 12, 2022

(65) Prior Publication Data

US 2022/0394710 A1    Dec. 8, 2022

Related U.S. Application Data

(63) Continuation of application No. PCT/CN2020/075393, filed on Feb. 14, 2020.

(51) Int. Cl.
*H04W 72/0446*      (2023.01)

(52) U.S. Cl.
CPC .............................. *H04W 72/0446* (2013.01)

(58) Field of Classification Search
CPC ........................ H04W 72/0446; H04W 72/20
See application file for complete search history.

(56) References Cited

U.S. PATENT DOCUMENTS

| | | | |
|---|---|---|---|
| 2017/0111926 A1* | 4/2017 | Madan | H04W 72/542 |
| 2019/0045536 A1* | 2/2019 | Gao | H04L 5/0048 |
| 2019/0081769 A1 | 3/2019 | Zhang et al. | |
| 2020/0296758 A1 | 9/2020 | Li et al. | |
| 2020/0404681 A1 | 12/2020 | Zhang et al. | |
| 2021/0127389 A1* | 4/2021 | Liu | H04W 84/047 |

(Continued)

FOREIGN PATENT DOCUMENTS

| | | |
|---|---|---|
| CN | 108811097 A | 11/2018 |
| CN | 110035526 A | 7/2019 |
| CN | 110115088 A | 8/2019 |

(Continued)

OTHER PUBLICATIONS

"UL transmission in preconfigured resources for eMTC," 3GPP TSG RAN WG1 Meeting #97, Reno, USA, R1-1906278, Total 5 pages, 3rd Generation Partnership Project, Valbonne, France (May 13-17, 2019).

(Continued)

*Primary Examiner* — Afshawn M Towfighi

(74) *Attorney, Agent, or Firm* — Leydig, Voit & Mayer, Ltd.

(57) ABSTRACT

A resource indication method, a resource determining method and a related apparatus that indicate transmission resources in two subframes are provided, which relate to the field of wireless communications technologies. The method includes a transmitting device determining first and second time domain resources and sending resource indication information on a third time domain resource, wherein the resource indication information indicates positions of the first and second time domain resources, and wherein a value of the resource indication information is determined by using the positions of the first and second time domain resources.

18 Claims, 5 Drawing Sheets

(56) References Cited

U.S. PATENT DOCUMENTS

2021/0219329 A1* 7/2021 Zhou .................... H04L 1/1819
2023/0022606 A1* 1/2023 Liu ...................... H04L 5/0005

FOREIGN PATENT DOCUMENTS

WO      2018236671 A1    12/2018
WO      2019158005 A1     8/2019
WO      2019174584 A1     9/2019

OTHER PUBLICATIONS

"3rd Generation Partnership Project; Technical Specification Group Radio Access Network; NR; Physical channels and modulation (Release 16)," 3GPP TS 38.211 V16.0.0, pp. 1-129, 3rd Generation Partnership Project, Valbonne, France (Dec. 2019).

"3rd Generation Partnership Project; Technical Specification Group Radio Access Network; NR; Physical layer procedures for control (Release 16)," 3GPP TS 38.213 V16.0.0, pp. 1-146, 3rd Generation Partnership Project, Valbonne, France (Dec. 2019).

"3rd Generation Partnership Project; Technical Specification Group Radio Access Network; NR; Physical layer procedures for data (Release 16)," 3GPP TS 38.214 V16.0.0, pp. 1-147, 3rd Generation Partnership Project, Valbonne, France (Dec. 2019).

"Summary#2 for AI 7.2.4.2.2 Mode-2 Resource Allocation," 3GPP TSG RAM WG1 Meeting #99, Reno, Nevada, USA, R1-1913450, Total 42 pages, 3rd Generation Partnership Project, Valbonne, France (Nov. 18-22, 2019).

* cited by examiner

RESOURCE INDICATION METHOD, RESOURCE DETERMINING METHOD, AND RELATED APPARATUS

CROSS-REFERENCE TO RELATED APPLICATIONS

This application is a continuation of International Application No. PCT/CN2020/075393, filed on Feb. 14, 2020, the disclosure of which is hereby incorporated by reference in its entirety.

TECHNICAL FIELD

Embodiments of this application relate to the field of wireless communications technologies, and in particular, to a resource indication method, a resource determining method, and a related apparatus.

BACKGROUND

In a wireless communications scenario, a transmitting device needs to allocate a transmission resource to a receiving device, and indicates, to the receiving device, the allocated transmission resource, so that the receiving device can transmit data to the transmitting device based on the indicated transmission resource. Currently, transmission resource indications are classified into consecutive resource indications and distributed resource indications.

FIG. 1 shows consecutive resource indications. The transmitting device may indicate a starting position of a resource and a length of the resource. For example, the transmitting device indicates, to the receiving device, that the starting position of the resource is a physical resource block (PRB) 3, and the length of the resource is 8. The receiving device may determine that indicated transmission resources are the PRB 3 to a PRB 10. Alternatively, the transmitting device may indicate a starting position and an ending position of a resource. For example, the transmitting device indicates, to the receiving device, that the starting position of the resource is a PRB 3, and the ending position of the resource is a PRB 10. The receiving device may determine that indicated transmission resources are the PRB 3 to the PRB 10.

FIG. 2 shows distributed resource indications. The transmitting device may send PRBs in a bandwidth to the receiving device in a manner of indicating an allocated resource and an invalid resource. For example, "1" indicates an allocated resource, and "0" indicates an invalid resource. In this case, the transmission resource indications shown in FIG. 2 may be "100111010".

However, the foregoing two resource indication methods can indicate transmission resources in only one subframe.

SUMMARY

This application provides a resource indication method, a resource determining method, and a related apparatus, to resolve a problem that transmission resources in only one subframe can be indicated in a conventional technology.

According to a first aspect, an embodiment of this application provides a resource indication method, including: determining, by a transmitting device, a first time domain resource and a second time domain resource; and sending, by the transmitting device, first resource indication information on a third time domain resource, where the first resource indication information is used to indicate a position of the first time domain resource and a position of the second time domain resource, and a value of the first resource indication information is determined by using the position of the first time domain resource and the position of the second time domain resource.

According to this solution, the transmitting device may determine the value of the first resource indication information by using the position of the first time domain resource and the position of the second time domain resource, and may indicate the two time domain resources by using the first resource indication information.

In a possible implementation, the third time domain resource is a start time domain resource in a first resource set; the first resource set is a resource set including the third time domain resource, the first time domain resource, and the second time domain resource; and a size of the first resource set is configured by using signaling or is predefined.

According to this solution, the third time domain resource is the start time domain resource in the first resource set. In this case, the transmitting device may send the first resource indication information based on the third time domain resource, and indicate the two time domain resources by using the first resource indication information.

In a possible implementation, the first time domain resource and/or the second time domain resource are/is resources/a resource used by the transmitting device to send data; or the first time domain resource and/or the second time domain resource are/is reserved resources/a reserved resource selected by the transmitting device; or the first time domain resource and/or the second time domain resource are/is used to assist a receiving device in determining a transmission resource.

According to this solution, the transmitting device may indicate, by using the first resource indication information, the resource used by the transmitting device to send the data; or indicate, by using the first resource indication information, the reserved resource selected by the sending device; or indicate, by using the first resource indication information, the first time domain resource and the second time domain resource that are used to assist the receiving device in determining the transmission resource.

In a possible implementation, the sending, by the transmitting device, first resource indication information on a third time domain resource includes: sending, by the transmitting device, the first resource indication information and second resource indication information on the third time domain resource, where the second resource indication information is used to indicate: a frequency domain starting position and a frequency domain resource size, on the third time domain resource, of first data sent by the transmitting device; and/or a frequency domain starting position and a frequency domain resource size, on the first time domain resource, of the first data sent by the transmitting device; and/or a frequency domain starting position and a frequency domain resource size, on the second time domain resource, of the first data sent by the transmitting device.

According to this solution, the transmitting device may further send the second resource indication information to the receiving device, and indicate, by using the second resource indication information, the frequency domain starting positions and the frequency domain resource sizes, on the third time domain resource, the first time domain resource, and the second time domain resource, of the first data sent by the transmitting device.

In a possible implementation, the value of the first resource indication information is determined by using the position of the first time domain resource, the position of the second time domain resource, and the size of the first resource set; the first resource set is the resource set including the third time domain resource, the first time domain resource, and the second time domain resource; and the size of the first resource set is configured by using signaling or predefined.

According to this solution, the transmitting device may determine the value of the first resource indication information based on the position of the first time domain resource, the position of the second time domain resource, and the first resource set.

In a possible implementation, the value of the first resource indication information is determined by using a time interval between the first time domain resource and the third time domain resource and/or a time interval between the second time domain resource and the first time domain resource.

According to this solution, the transmitting device may determine the value of the first resource indication information based on the time interval between the first time domain resource and the third time domain resource and the time interval between the second time domain resource and the first time domain resource.

In a possible implementation, the value of the first resource indication information is determined by using a time interval between the first time domain resource and the third time domain resource, a time interval between the second time domain resource and the first time domain resource, and the size of the first resource set; the first resource set is the resource set including the third time domain resource, the first time domain resource, and the second time domain resource; and the size of the first resource set is configured by using signaling or predefined.

According to this solution, the transmitting device may determine the value of the first resource indication information based on the time interval between the first time domain resource and the third time domain resource, the time interval between the second time domain resource and the first time domain resource, and the size of the first resource set.

In a possible implementation, the value of the first resource indication information satisfies the following formula:

$$(W-2)*(L-1)+(t2-t1)+C; \text{ or}$$

$$(W-2)*(W-L-1)+(W-3-(t2-t1))+C$$

where $L=t1-t0$; W is the size of the first resource set, the first resource set is the resource set including the third time domain resource, the first time domain resource, and the second time domain resource, and the size of the first resource set is configured by using signaling or predefined; t0 is a position of the third time domain resource; t1 is the position of the first time domain resource; t2 is the position of the second time domain resource; and C is an integer.

According to this solution, the transmitting device may determine the value of the first resource indication information by using the foregoing formula.

In a possible implementation, the value of the first resource indication information satisfies the following formula:

$$30*(t1-t0-1)+(t2-t1)+C; \text{ or}$$

$$30*(31-t1+t0)+(29-(t2-t1))+C$$

where t0 is a position of the third time domain resource, t1 is the position of the first time domain resource, t2 is the position of the second time domain resource, and C is an integer.

According to this solution, the transmitting device may determine the value of the first resource indication information by using the foregoing formula.

In a possible implementation, the value of the first resource indication information is determined based on a first threshold and a difference between the first time domain resource and the third time domain resource.

According to this solution, the transmitting device may determine the value of the first resource indication information based on the first threshold and the difference between the first time domain resource and the third time domain resource.

In a possible implementation, that the first resource indication information is determined based on a first threshold and a difference between the first time domain resource and the third time domain resource includes: if the difference between the first time domain resource and the third time domain resource is less than or equal to the first threshold, the first resource indication information is set to a first value; or if the difference between the first time domain resource and the third time domain resource is greater than the first threshold, the first resource indication information is set to a second value.

According to this solution, the transmitting device may determine, based on the value relationship between the first threshold and the difference between the first time domain resource and the third time domain resource, whether the value of the first resource indication information is the first value or the second value.

In a possible implementation, the first value satisfies the following formula:

$$(W-2)*(L-1)+(t2-t1)+C,$$

where $L=t1-t0$; W is the size of the first resource set, the first resource set is the resource set including the third time domain resource, the first time domain resource, and the second time domain resource, and the size of the first resource set is configured by using signaling or predefined; t0 is a position of the third time domain resource; t1 is the position of the first time domain resource; t2 is the position of the second time domain resource; and C is an integer.

According to this solution, the transmitting device may determine the value of the first resource indication information, namely, the first value, by using the foregoing formula.

In a possible implementation, the second value satisfies the following formula:

$$(W-2)*(W-L-1)+(W-3-(t2-t1))+C$$

where $L=t1-t0$; W is the size of the first resource set, the first resource set is the resource set including the third time domain resource, the first time domain resource, and the second time domain resource, and the size of the first resource set is configured by using signaling or predefined; t0 is a position of the third time domain resource; t1 is the position of the first time domain resource; t2 is the position of the second time domain resource; and C is an integer.

According to this solution, the transmitting device may determine the value of the first resource indication information, namely, the second value, by using the foregoing formula.

In a possible implementation, the first value satisfies the following formula:

$$30*(t1-t0-1)+(t2-t1)+C,$$

where t0 is a position of the third time domain resource, t1 is the position of the first time domain resource, t2 is the position of the second time domain resource, and C is an integer.

According to this solution, the transmitting device may determine the value of the first resource indication information, namely, the first value, by using the foregoing formula.

In a possible implementation, the second value satisfies the following formula:

$$30*(31-t1+t0)+(29-(t2-t1))+C$$

where t0 is a position of the third time domain resource,
t1 is the position of the first time domain resource, t2 is the position of the second time domain resource, and C is an integer.

According to this solution, the transmitting device may determine the value of the first resource indication information, namely, the second value, by using the foregoing formula.

In a possible implementation, if the value of the first resource indication information is a third value, indication information of the first time domain resource and the second time domain resource in the first resource indication information is invalid information, or the first time domain resource and the second time domain resource are invalid resources; or if the value of the first resource indication information is a fourth value, the first time domain resource is a valid resource and the second time domain resource is an invalid resource, or indication information of the first time domain resource in the first resource indication information is valid information, and indication information of the second time domain resource in the first resource indication information is invalid information; or if the value of the first resource indication information is a fifth value, the first time domain resource and the second time domain resource are valid resources, or indication information of the first time domain resource and indication information of the second time domain resource in the first resource indication information are valid information.

According to this solution, the transmitting device may indicate, based on the value of the first resource indication information, validity of the first time domain resource and the second time domain resource, and validity of the indication information of the first time domain resource and the indication information of the second time domain resource in the first resource indication information.

In a possible implementation, the third value is a single value, the fourth value is 31 different values, and the fifth value is 465 different values.

According to this solution, the transmitting device may separately determine the third value, the fourth value, and the fifth value.

In a possible implementation, the third value is 0, the fourth value is 31 different values from 1 to 31, and the fifth value is 465 different values greater than or equal to 32; or the third value is greater than 464, the fourth value is 31 different values greater than 464, and the fifth value is a total of 465 different values from 0 to 464.

According to this solution, the transmitting device may separately determine the third value, the fourth value, and the fifth value.

In a possible implementation, the method further includes: sending, by the transmitting device, third indication information on a reference resource, where the third indication information is used to indicate that a time domain reference point of the first resource indication information is a time domain resource used by the transmitting device to send the first data.

According to this solution, the transmitting device may further send the third indication information to the receiving device, to indicate that the time domain reference point of the first resource indication information is the time domain resource for sending the first data.

In a possible implementation, if the third indication information is set to a sixth value, the position of the first time domain resource is (t0+d1), and the position of the second time domain resource is (t0+d2), where t0 is the position of the third time domain resource, d1 is the interval between the first time domain resource and the third time domain resource, and d2 is the interval between the second time domain resource and the third time domain resource; or if the third indication information is set to a seventh value, the position of the first time domain resource is (t0−d1), and the position of the second time domain resource is (t0+d2−d1), where t0 is the position of the third time domain resource; d1 is the interval between the first time domain resource and the third time domain resource, and d2 is the interval between the second time domain resource and the third time domain resource; or if the third indication information is set to an eighth value, the position of the first time domain resource is (t0−d2), and the position of the second time domain resource is (t0+d1−d2), where t0 is the position of the third time domain resource, d1 is the interval between the first time domain resource and the third time domain resource, and d2 is the interval between the second time domain resource and the third time domain resource.

According to this solution, when the time domain reference point of the first resource indication information is the time domain resource for sending the first data, the transmitting device may determine the position of the first time domain resource and the position of the second time domain resource based on the value of the third indication information.

In a possible implementation, the method further includes: sending, by the transmitting device, fourth indication information on a reference resource, where the fourth indication information is used to indicate that a time domain reference point of the first resource indication information is the third time domain resource.

According to this solution, the transmitting device may further send the fourth indication information to the receiving device, to indicate that the time domain reference point of the first resource indication information is the third time domain resource.

In a possible implementation, if the fourth indication information is set to a ninth value, the position of the first time domain resource is (t0+d1), and the position of the second time domain resource is (t0+d2), where t0 is the position of the third time domain resource, d1 is the interval between the first time domain resource and the third time domain resource, and d2 is the interval between the second time domain resource and the third time domain resource; or if the fourth indication information is set to a tenth value, the position of the first time domain resource is (t0−d1), and the position of the second time domain resource is (t0+d2), where t0 is the position of the third time domain resource; d1 is the interval between the first time domain resource and the third time domain resource, and d2 is the interval between the second time domain resource and the third time domain resource; or if the fourth indication information is set to an eleventh value, the position of the first time domain resource is (t0−d1), and the position of the second time domain resource is (t0−d2), where t0 is the position of the third time domain resource, d1 is the interval between the first time domain resource and the third time domain resource, and d2 is the interval between the second time domain resource and the third time domain resource.

According to this solution, when the time domain reference point of the first resource indication information is the third time domain resource, the transmitting device may determine the position of the first time domain resource and the position of the second time domain resource based on the value of the first resource indication information.

In a possible implementation, the third indication information or the fourth indication information is a new data indicator NDI; and/or the third indication information or the fourth indication information is indication information of a redundancy version RV.

According to this solution, the third indication information and the fourth indication information may be indicated by using the NDI and/or the RV.

In a possible implementation, the first resource indication information, the second resource indication information, and/or the third indication information are/is indicated by using sidelink control information; or the first resource indication information, the second resource indication information, and/or the fourth indication information are/is indicated by using sidelink control information.

According to this solution, the transmitting device may indicate the first resource indication information, the second resource indication information, the third indication information, and the fourth indication information by using the sidelink control information.

According to a second aspect, an embodiment of this application further provides a resource determining method, including: receiving, by a receiving device, resource indication information on a third time domain resource; and determining, by the receiving device based on the resource indication information and a size of a first resource set, a position of a first time domain resource in the first resource set and a position of a second time domain resource in the first resource set; the first resource set is a resource set including the third time domain resource, the first time domain resource, and the second time domain resource; and the size of the first resource set is configured by using signaling or predefined.

According to this solution, the receiving device may determine the position of the first time domain resource in the first resource set and the position of the second time domain resource in the first resource set by using the resource indication information sent by a transmitting device.

In a possible implementation, the resource indication information includes first resource indication information; and the first resource indication information is used to indicate a position of the first time domain resource and a position of the second time domain resource, and a value of the first resource indication information is determined by using the position of the first time domain resource and the position of the second time domain resource.

According to this solution, the receiving device may determine the position of the first time domain resource and the position of the second time domain resource based on the value of the first resource indication information.

In a possible implementation, the resource indication information includes second resource indication information; and the second resource indication information is used to indicate: a frequency domain starting position and a frequency domain resource size, on the third time domain resource, of first data sent by the transmitting device; and/or a frequency domain starting position and a frequency domain resource size, on the first time domain resource, of the first data sent by the transmitting device; and/or a frequency domain starting position and a frequency domain resource size, on the second time domain resource, of the first data sent by the transmitting device.

According to this solution, the receiving device may determine, based on the second resource indication information, the frequency domain starting positions and the frequency domain resource sizes, on the third time domain resource, the first time domain resource, and the second time domain resource, of the first data sent by the transmitting device.

In a possible implementation, the third time domain resource is a start time domain resource in the first resource set; the first resource set is the resource set including the third time domain resource, the first time domain resource, and the second time domain resource; and the size of the first resource set is configured by using signaling or predefined.

According to this solution, the receiving device may receive the resource indication information on the start time domain resource in the first resource set.

In a possible implementation, the first time domain resource and/or the second time domain resource are/is resources/a resource used by the transmitting device to send data; or the first time domain resource and/or the second time domain resource are/is reserved resources/a reserved resource selected by the transmitting device; or the first time domain resource and/or the second time domain resource are/is used to assist the receiving device in determining a transmission resource.

According to this solution, the receiving device may determine, by using the resource indication information, the resource used by the transmitting device to send the data; or indicate, by using the resource indication information, the reserved resource selected by the transmitting device; or indicate, by using the resource indication information, the first time domain resource and the second time domain resource used for data transmission.

In a possible implementation, the determining, by the receiving device based on the resource indication information and a size of a first resource set, a position of a first time domain resource in the first resource set and a position of a second time domain resource in the first resource set includes: determining, by the receiving device, a time interval between the first time domain resource and the third time domain resource and a time interval between the second time domain resource and the first time domain resource based on the resource indication information and the size of the first resource set; and determining, by the receiving device, the position of the first time domain resource in the first resource set and the position of the second time domain resource in the first resource set based on the time interval between the first time domain resource and the third time domain resource and the time interval between the second time domain resource and the first time domain resource.

According to this solution, the receiving device may determine the time interval between the first time domain resource and the third time domain resource and the time interval between the second time domain resource and the first time domain resource based on the resource indication information and the size of the first resource set, and further determine the positions of the first time domain resource and the second time domain resource in the first resource set based on the time intervals.

In a possible implementation, the time interval between the first time domain resource and the third time domain resource and the time interval between the second time domain resource and the first time domain resource satisfy the following formulas:

$$a=f((RIV-C)/(W-2))+1 \text{ and } b=(RIV-C)\bmod(W-2); \text{ and}$$

$$L=W-a=t1-t0 \text{ and } O=W-3-b=t2-t0-L; \text{ or } L=a=t1-t0 \text{ and } O=b=t2-t0-L$$

where W is the size of the first resource set, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the time interval between the first time domain resource and the third time domain resource and the time interval between the second time domain resource and the first time domain resource according to the foregoing formulas.

In a possible implementation, the time interval between the first time domain resource and the third time domain resource and the time interval between the second time domain resource and the first time domain resource satisfy the following formulas:

$$a=f((RIV-C)/30)+1 \text{ and } b=(RIV-C)\bmod 30; \text{ and}$$

$$RIV-C=30*(L-1)+O \text{ or } RIV-C=30*(29-L)+(29-O)$$

where $L=t1-t0$, W is the size of the first resource set, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the time interval between the first time domain resource and the third time domain resource and the time interval between the second time domain resource and the first time domain resource according to the foregoing formulas.

In a possible implementation, the time interval between the first time domain resource and the third time domain resource and the time interval between the second time domain resource and the first time domain resource are determined based on a difference between the size of the first resource set and the value of the first resource indication information.

According to this solution, the receiving device may determine the time interval between the first time domain resource and the third time domain resource and the time interval between the second time domain resource and the first time domain resource based on the difference between the size of the first resource set and the value of the first resource indication information.

In a possible implementation, that the time interval between the first time domain resource and the third time domain resource and the time interval between the second time domain resource and the first time domain resource are determined based on a difference between the size of the first resource set and the value of the first resource indication information includes: if the difference between the size of the first resource set and the value of the first resource indication information is less than or equal to a second threshold, the time interval between the first time domain resource and the third time domain resource is a twelfth value, and the time interval between the second time domain resource and the first time domain resource is a thirteenth value; or if the difference between the size of the first resource set and the value of the first resource indication information is greater than a second threshold, the time interval between the first time domain resource and the third time domain resource is a fourteenth value, and the time interval between the second time domain resource and the first time domain resource is a fifteenth value.

According to this solution, the receiving device may determine a value of the time interval between the first time domain resource and the third time domain resource and a value of the time interval between the second time domain resource and the first time domain resource based on the value relationship between the second threshold and the difference between the size of the first resource set and the value of the first resource indication information.

In a possible implementation, the twelfth value and the thirteenth value satisfy the following formulas:

$$a=f((RIV-C)/(W-2))+1; \; b=(RIV-C)\bmod(W-2); \; L=W-a=t1-t0; \text{ and } O=W-3-b=t2-t0-L$$

where $N=W-2$, W is the size of the first resource set, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the value of the time interval between the first time domain resource and the third time domain resource according to the foregoing formulas.

In a possible implementation, the fourteenth value and the fifteenth value satisfy the following formulas:

$$a=f((RIV-C)/(W-2))+1 \text{ and } b=(RIV-C)\bmod(W-2); \text{ and}$$

$$L=a=t1-t0 \text{ and } O=b=t2-t0-L$$

where W is the size of the first resource set, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the value of the time interval between the second time domain resource and the first time domain resource according to the foregoing formulas.

In a possible implementation, the twelfth value and the thirteenth value satisfy the following formulas:

$$a=f((RIV-C)/30)+1 \text{ and } b=(RIV-C)\bmod 30; \text{ and}$$

$$RIV-C=30*(L-1)+O$$

where $L=t1-t0$, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the value of the time interval between the first time domain resource and the third time domain resource according to the foregoing formulas.

In a possible implementation, the fourteenth value and the fifteenth value satisfy the following formulas:

$$a=f((RIV-C)/30)+1 \text{ and } b=(RIV-C)\bmod 30; \text{ and}$$

$$RIV-C=30*(29-L)(29-O)$$

where L=t1−t0, t0 is a position of the third time domain resource, t1 is the position of the first time domain resource, t2 is the position of the second time domain resource, C is an integer, and RIV is the value of the first resource indication information in the resource indication information.

According to this solution, the receiving device may determine the value of the time interval between the second time domain resource and the first time domain resource according to the foregoing formulas.

In a possible implementation, the resource indication information includes the first resource indication information, and the first resource indication information is used to indicate the position of the first time domain resource and the position of the second time domain resource. If the value of the first resource indication information is a third value, indication information of the first time domain resource and the second time domain resource is invalid information, or the first time domain resource and the second time domain resource are invalid resources; or if the value of first resource indication information is a fourth value, the first time domain resource is a valid resource and the second time domain resource is an invalid resource, or indication information of the first time domain resource is valid information, and indication information of the second time domain resource is invalid information; or if the value of the first resource indication information is a fifth value, the first time domain resource and the second time domain resource are valid resources, or indication information of the first time domain resource and indication information of the second time domain resource are valid information.

According to this solution, the receiving device may determine, based on the value of the first resource indication information, validity of the first time domain resource and the second time domain resource, and validity of the indication information of the first time domain resource and the indication information of the second time domain resource.

In a possible implementation, the third value is a single value, the fourth value is 31 different values, and the fifth value is 465 different values.

According to this solution, the receiving device may determine the third value, the fourth value, and the fifth value.

In a possible implementation, the third value is a single value 0, the fourth value is 31 different values from 1 to 31, and the fifth value is 465 different values greater than or equal to 32; or the third value is greater than 464, the fourth value is 31 different values greater than 464, and the fifth value is a total of 465 different values from 0 to 464.

According to this solution, the receiving device may determine the third value, the fourth value, and the fifth value.

In a possible implementation, the resource indication information includes the first resource indication information, and the first resource indication information is used to indicate the position of the first time domain resource and the position of the second time domain resource; and the method further includes: receiving, by the receiving device, third indication information on the third time domain resource, where the third indication information is used to indicate that a time domain reference point of the first resource indication information is a time domain resource used by the transmitting device to send the first data.

According to this solution, the receiving device may determine, based on the third indication information, that the time domain reference point of the first resource indication information is the time domain resource used by the transmitting device to send the first data.

In a possible implementation, if the third indication information is set to a sixth value, the position of the first time domain resource is (t0+d1), and the position of the second time domain resource is (t0+d2), where t0 is the position of the third time domain resource, d1 is the interval between the first time domain resource and the third time domain resource, and d2 is the interval between the second time domain resource and the third time domain resource; or if the third indication information is set to a seventh value, the position of the first time domain resource is (t0−d1), and the position of the second time domain resource is (t0+d2−d1), where t0 is the position of the third time domain resource; d1 is the interval between the first time domain resource and the third time domain resource, and d2 is the interval between the second time domain resource and the third time domain resource; or if the third indication information is set to an eighth value, the position of the first time domain resource is (t0−d2), and the position of the second time domain resource is (t0+d1−d2), where t0 is the position of the third time domain resource, d1 is the interval between the first time domain resource and the third time domain resource, and d2 is the interval between the second time domain resource and the third time domain resource.

According to this solution, when the time domain reference point of the first resource indication information is the time domain resource for sending the first data, the receiving device may determine the position of the first time domain resource and the position of the second time domain resource based on the value of the third indication information.

In a possible implementation, the resource indication information includes the first resource indication information, and the first resource indication information is used to indicate the position of the first time domain resource and the position of the second time domain resource; and the method further includes: sending, by the receiving device, fourth indication information on the third time domain resource, where the fourth indication information is used to indicate that a time domain reference point of the first resource indication information is the third time domain resource.

According to this solution, the receiving device may determine, based on the fourth indication information, that the time domain reference point of the first resource indication information is the third time domain resource.

In a possible implementation, if the fourth indication information is set to a ninth value, the position of the first time domain resource is (t0+d1), and the position of the second time domain resource is (t0+d2), where t0 is the position of the third time domain resource, d1 is the interval between the first time domain resource and the third time domain resource, and d2 is the interval between the second time domain resource and the third time domain resource; or if the fourth indication information is set to a tenth value, the position of the first time domain resource is (t0−d1), and the position of the second time domain resource is (t0+d2), where t0 is the position of the third time domain resource; d1 is the interval between the first time domain resource and the third time domain resource, and d2 is the interval between the second time domain resource and the third time domain resource; or if the fourth indication information is set to an eleventh value, the position of the first time domain resource is (t0−d1), and the position of the second time domain resource is (t0−d2), where t0 is the position of the third time domain resource, d1 is the interval between the first time domain resource and the third time domain resource, and d2 is the interval between the second time domain resource and the third time domain resource.

According to this solution, when the time domain reference point of the first resource indication information is the third time domain resource, the receiving device may determine the position of the first time domain resource and the position of the second time domain resource based on the value of the first resource indication information.

In a possible implementation, the third indication information or the fourth indication information is a new data indicator (NDI0; and/or the third indication information or the fourth indication information is a redundancy version RV.

According to this solution, the third indication information and the fourth indication information may be indicated by using the NDI and/or the RV.

In a possible implementation, the first resource indication information, the second resource indication information, and/or the third indication information are indicated by using sidelink control information; or the first resource indication information, the second resource indication information, and/or the fourth indication information are indicated by using sidelink control information.

According to this solution, the transmitting device may indicate the first resource indication information, the second resource indication information, the third indication information, and the fourth indication information by using the sidelink control information.

According to a third aspect, an embodiment of this application further provides a resource indication apparatus. The terminal may be configured to perform the operation in any one of the first aspect or the possible implementations of the first aspect. For example, the terminal may include a module or a unit configured to perform each operation in any one of the first aspect or the possible implementations of the first aspect. For example, the terminal includes a processing unit and a communications unit.

According to a fourth aspect, an embodiment of this application further provides a resource determining apparatus. The resource determining apparatus may be configured to perform the operation in any one of the second aspect or the possible implementations of the second aspect. For example, a core network device may include a module or a unit configured to perform each operation in any one of the second aspect or the possible implementations of the second aspect. For example, the resource determining apparatus includes a processing unit and a communications unit.

According to a fifth aspect, an embodiment of this application further provides a communications system, including the resource indication apparatus according to the third aspect and the resource determining apparatus according to the fourth aspect.

According to a sixth aspect, an embodiment of this application provides a chip system. The chip system includes a processor, and optionally further includes a memory. The memory is configured to store a computer program. The processor is configured to invoke the computer program from the memory and run the computer program, to enable a communications device on which the chip system is installed to perform the method according to any one of the first aspect or the possible implementations of the first aspect; and/or to enable a communications device on which the chip system is installed to perform the method according to any one of the second aspect or the possible implementations of the second aspect.

According to a seventh aspect, an embodiment of this application provides a computer program product. The computer program product includes computer program code. When the computer program code is run by a communications unit and a processing unit or a transceiver and a processor of a communications device, the communications device is enabled to perform the method according to any one of the first aspect or the possible implementations of the first aspect; and/or a communications device in which a chip system is installed is enabled to perform the method according to any one of the second aspect or the possible implementations of the second aspect.

According to an eighth aspect, an embodiment of this application provides a computer-readable storage medium. The computer-readable storage medium stores a program, and the program enables a communications device (for example, a terminal) to perform the method according to any one of the first aspect or the possible implementations of the first aspect; and/or enables a communications device (for example, a core network device) on which a chip system is installed is enabled to perform the method according to any one of the second aspect or the possible implementations of the second aspect.

For a technical effect that can be achieved by any possible implementation of any one of the third aspect to the eighth aspect, refer to the technical effect of a corresponding possible implementation of the first aspect and the second aspect. Details are not described herein again.

DESCRIPTION OF EMBODIMENTS

Figure 1:
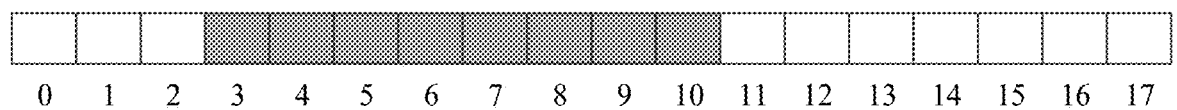
FIG. 1 is a schematic diagram of consecutive resource indications according to this application.

The following describes technical solutions of this application with reference to accompanying drawings.

The technical solutions in the embodiments of this application may be applied to various communications systems, for example, a long term evolution (LTE) system, a worldwide interoperability for microwave access (WiMAX) communications system, a future 5th generation (5G) system such as a new radio access technology (NR), and a future communications system such as a 6G system.

In the following descriptions, some terms in the embodiments of this application are described, to help a person skilled in the art have a better understanding.

(1) A terminal apparatus may be a terminal device or a chip or another component that is disposed in a terminal device and that can implement a function of the terminal device. The terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone, a tablet computer (Pad), a computer having wireless sending and receiving functions, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, a terminal device having wireless sending and receiving functions and a chip that may be disposed in the foregoing terminal device are collectively referred to as terminal devices.

The terminal device includes a device that provides a voice and/or data connectivity for a user. Specifically, the terminal device includes a device that provides a voice for a user, or includes a device that provides data connectivity for a user, or includes a device that provides a voice and data connectivity for a user. For example, the terminal device may include a handheld device having a wireless connection function, or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device communication (device-to-device, D2D) terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, or the like. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, and not limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently designs of daily wear, such as glasses, gloves, watches, clothes, and shoes. The wearable device is a portable device that can be directly worn by a user or integrated into clothes or an accessory of a user. The wearable device is not merely a hardware device, but is configured to implement a powerful function through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

Device-to-device (D2D) communication or V2X communication is a technology by using which terminal devices directly communicate with each other.

In the embodiments of this application, any device that can perform data communication with a base station may be considered as a terminal device.

(2) A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an IP packet, and serve as a router between the terminal device and a remaining part of the access network. The remaining part of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (eNB, or e-NodeB, evolutional Node B) in an LTE system or a long term evolution-advanced (long term evolution-advanced, LTE-A) system, or may include a next generation NodeB (gNB) in a 5G new radio (NR) system (which is also referred to as an NR system), or may include a centralized unit (CU) and a distributed unit (DU) in a cloud access network (cloud radio access network, Cloud RAN) system. This is not limited in the embodiments of this application.

The network device may further include a core network device. However, because the embodiments of this application mainly relate to an access network device, a network device mentioned below may refer to an access network device unless otherwise specified.

(2) Vehicle-to-everything (V2X) means that a vehicle is connected to and communicates with the outside, and is a basic and key technology of future smart vehicles, automatic driving, and intelligent transport systems. On a basis of an existing D2D technology, a specific application requirement of the V2X is to be optimized in the V2X, to further reduce an access delay of a V2X device and resolve a resource conflict problem.

Figure 2:
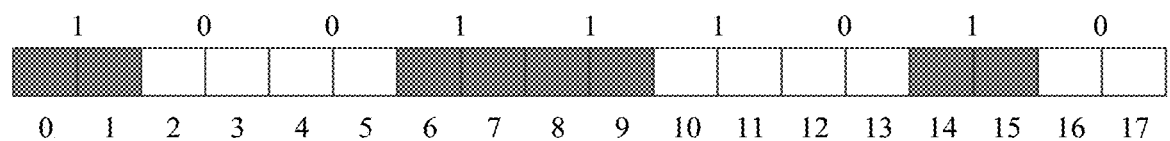
FIG. 2 is a schematic diagram of distributed resource indications according to this application.

The V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction. As shown in FIG. 2, V2V refers to communication between vehicles. V2P refers to communication between a vehicle and a person (including a pedestrian, a bicycle rider, a driver, or a passenger). V2I refers to communication between a vehicle and a network device, for example, an RSU. In addition, another type of V2N may be included in the V2I. The V2N refers to communication between a vehicle and a base station/network.

The V2P may be used for safety warning for a pedestrian or a non-motor vehicle on a road. A vehicle may communicate, through the V2I, with a road or even another infrastructure such as a traffic light or a road barrier, to obtain road management information such as a traffic light signal time sequence. The V2V may be used for information exchange and reminding between vehicles, and a most typical application is an anti-collision safety system between vehicles. The V2N is currently the most widely used form of an internet of vehicles, and a main function of the V2N is to enable a vehicle to connect to a cloud server through a mobile network, to use an application function, such as navigation, entertainment, or anti-theft, provided by the cloud server.

In V2X, communication is mainly performed between terminal devices. For a transmission mode between terminal devices, a current standard protocol supports a broadcast mode, a multicast mode, and a unicast mode.

Broadcast mode: The broadcast mode means that a terminal device used as a transmitting end sends data in the broadcast mode, and a plurality of terminal devices can receive sidelink control information (SCI) or a sidelink shared channel (SSCH) from the transmitting end.

Multicast mode: The multicast mode is similar to the broadcast mode. A terminal device used as a transmitting end sends data in the broadcast mode. A group of terminal devices can parse SCI or an SSCH.

Unicast mode: In the unicast mode, one terminal device sends data to another terminal device, and the another terminal device does not need to or cannot parse the data.

(3) A time unit may be, for example, a slot or a subframe, or may be another time unit.

(4) In a case of a normal cyclic prefix, one slot in an NR system includes 14 OFDM symbols. In a case of an extended cyclic prefix, one slot in an NR system includes 12 OFDM symbols. For example, a slot length corresponding to a subcarrier spacing of 15 kHz is 1 ms, a slot length corresponding to a subcarrier spacing of 30 kHz is 0.5 ms, a slot length corresponding to a subcarrier spacing of 60 kHz is 0.25 ms, and a slot length corresponding to a subcarrier spacing of 120 kHz is 0.125 ms.

(5) The terms "system" and "network" may be interchangeably used in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or an expression similar to the term indicates any combination of the items, and includes a single item (piece) or any combination of a plurality of items (pieces). For example, at least one of a, b, or c may indicate: a; b; c; a and b; a and c; b and c; or a, b, and c; where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance degrees of the plurality of objects. For example, a first value and a second value are merely used to distinguish between different values, and do not indicate different content, different priorities, different importance degrees, or the like of the two values.

The foregoing describes some noun concepts in the embodiments of this application. The following describes technical features in the embodiments of this application.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In the embodiments of this application, information, a signal, a message, or a channel may be interchangeably used sometimes. It should be noted that meanings expressed by the terms are consistent when differences between the terms are not emphasized. "Of", "corresponding, relevant", and "corresponding" may be interchangeably used sometimes. It should be noted that meanings expressed by the terms are consistent when differences between the terms are not emphasized.

A network architecture and a service scenario that are described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

The embodiments of this application may be applied to a conventional typical network, or may be applied to a future UE-centric network. A non-cell network architecture is introduced to the UE-centric network. To be specific, a large quantity of small cells are deployed in a specific area to form a hyper cell. Each small cell is a transmission point (TP) or a transmission reception point (TRP) of the hyper cell, and is connected to a centralized controller. When UE moves in the hyper cell, a network side device selects a new sub-cluster for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In the embodiments of this application, different base stations may be base stations that have different identifiers, or may be base stations that have a same identifier and that are deployed at different geographical locations. Before being deployed, a base station does not know whether the base station is related to a scenario to which the embodiments of this application are applied. Therefore, before being deployed, the base station or a baseband chip needs to support a method provided in the embodiments of this application. It may be understood that the different identifiers of the foregoing base stations may be base station identifiers, cell identifiers, or other identifiers.

In the embodiments of this application, an NR network scenario in a wireless communications network is used as an example to describe some scenarios. It should be noted that the solutions in the embodiments of this application may further be applied to another wireless communications network, and a corresponding name may also be replaced with a name of a corresponding function in the another wireless communications network.

Figure 3:
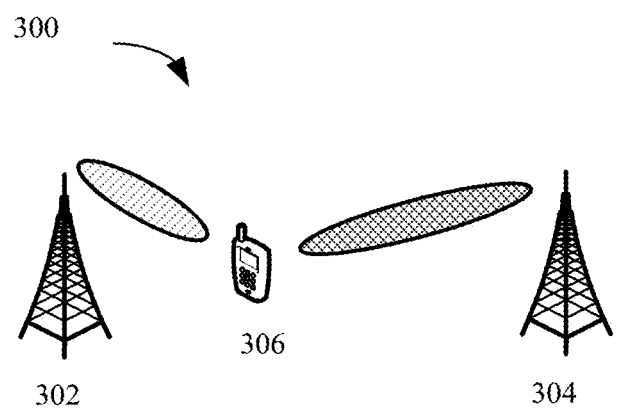
FIG. 3 is a schematic diagram of a communications system according to this application.

For ease of understanding the embodiments of this application, a communications system shown in FIG. 3 are first used as an example to describe in detail a communications system to which the embodiments of this application are applicable. FIG. 3 is a schematic diagram of a communications system to which a resource indication and determining method according to an embodiment of this application is applicable. It should be understood that in the embodiments of this application, a transmitting device may be a terminal device or a network device, and a receiving device may also be a network device or a terminal device. Without loss of generality, the following describes the communications system in the embodiments of this application by using an example in which a transmitting device is a network device and a receiving device is a terminal device. As shown in FIG. 3, the communications system 300 includes a network device 302 and a terminal device 306. A plurality of antennas may be configured for the network device 302, and a plurality of antennas may also be configured for the receiving device. Optionally, the communications system may further include a network device 304, and a plurality of antennas may also be configured for the network device 304.

It should be understood that the network device 302 or the network device 304 may further include a plurality of components (for example, a processor, a modulator, a multiplexer, a demodulator, or a demultiplexer) related to signal sending and receiving.

The network device is a device having wireless sending and receiving functions or a chip that may be disposed in the device. The device includes but is not limited to: an evolved NodeB (eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (transmission and reception point, TRP or transmission point, TP), or the like.

The device may alternatively be a gNB or a transmission point (TRP or TP) in a 5G system, for example, an NR system, or one antenna panel or one group (including a plurality of antenna panels) of antenna panels of a gNodeB in a 5G system. The device may alternatively be a network node, for example, a baseband unit (BBU) or a distributed unit (DU) that constitutes a gNB or a transmission point.

In some deployments, the gNB may include a centralized unit (CU) and a DU. The gNB may further include a radio frequency unit (RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, it may also be considered that higher layer signaling, such as RRC layer signaling or PDCP layer signaling, may be sent by the DU or sent by the DU and the CU. It may be understood that the network device may be a CU node, a DU node, or a device including a CU node and a DU node. In addition, the CU may be classified as a network device in an access network RAN, or the CU may be classified as a network device in a core network CN. This is not limited herein.

In the communications system 300, the network device 302 and the network device 304 each may communicate with a plurality of terminal devices (for example, the terminal device 306 shown in the figure). The network device 302 and the network device 304 may communicate with one or more terminal devices similar to the terminal device 306. However, it should be understood that a terminal device communicating with the network device 302 and a terminal device communicating with the network device 304 may be the same or may be different. The terminal device 306 shown in FIG. 3 may communicate with both the network device 302 and the network device 304. However, FIG. 3 shows only a possible scenario. In some scenarios, the terminal device may communicate with only the network device 302 or the network device 304. This is not limited in this application.

It should be understood that FIG. 3 is merely a simplified schematic diagram used as an example for ease of understanding. The communications system may further include another network device or another terminal device that is not shown in FIG. 3.

It should be understood that the technical solutions of this application may be applied to a wireless communications system, for example, the communications system 300 shown in FIG. 3. The communications system may include at least one network device and at least one terminal device, and the network device and the terminal device may communicate with each other through a radio air interface. For example, the network device in the communications system may correspond to the network device 302 and the network device 306 shown in FIG. 3, and the terminal device may correspond to the terminal device 304 shown in FIG. 3.

In the embodiments of this application, on a cellular link, a transmitting device may be a network device or a terminal device, and a receiving device may be a network device or a terminal device. On a relay (backhaul) link, a transmitting device may be a first-type base station, and a receiving device may be a second-type base station. The first-type base station and the second-type base station may be of a same type, for example, may be both macro base stations, small cells, micro base stations, primary cells, or secondary cells. Alternatively, the first-type base station and the second-type base station may be different base stations. On a sidelink, a transmitting device and a receiving device may be terminal devices or network devices of a same type, or may be road side stations or terminal devices. When both the transmitting device and the receiving device are network devices or road side stations, the transmitting device and the receiving device may be base stations of a same type, or may be base stations of different devices. A function of the sidelink is similar to that of the relay link, but an air interface technology used by the sidelink may be the same as or different from that used by the relay link.

The following describes the embodiments of this application in detail by using a general interaction process between a terminal device and a network device as an example. The terminal device may be a terminal device that is in a wireless communications system and that has a wireless connection relationship with the network device. It may be understood that the network device and a plurality of terminal devices that are in the wireless communications system and that have wireless connection relationships with the network device may indicate and determine a first time domain resource and a second time domain resource according to same technical solutions. This is not limited in this application.

Figure 4:
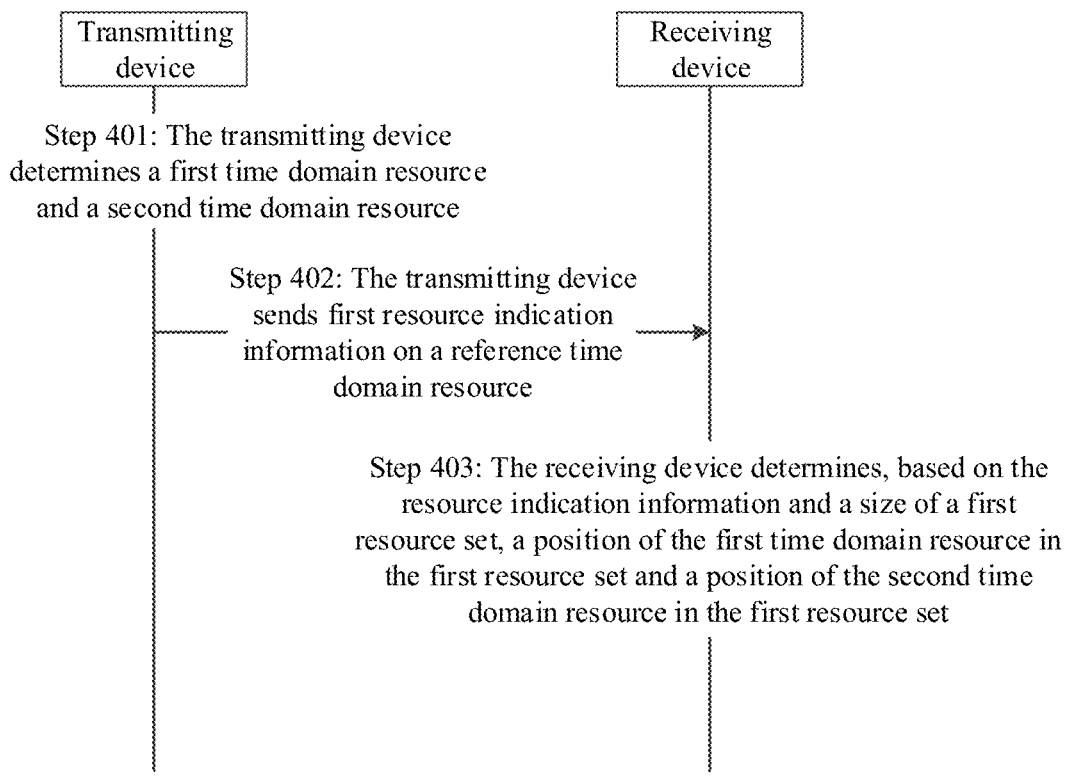
FIG. 4 is a flowchart of a resource indication and determining method according to this application.

FIG. 4 is an example of a flowchart of a resource indication and determining method according to an embodiment of this application from a perspective of device interaction. As shown in FIG. 4, the method may include the following steps.

Step 401: A transmitting device determines a first time domain resource and a second time domain resource.

Step 402: The transmitting device sends first resource indication information on a third time domain resource.

The first resource indication information is used to indicate a position of the first time domain resource and a position of the second time domain resource, and the first resource indication information is jointly determined by using the position of the first time domain resource and the position of the second time domain resource.

Optionally, in the present invention, a physical meaning of (t1−t0) is an interval between the first time domain resource and the third time domain resource. Similarly, a physical meaning of (t2−t0) is an interval between the second time domain resource and the third time domain resource. Similarly, a physical meaning of (t2−t1) is an interval between the first time domain resource and the second time domain resource. Optionally, if t0 is a slot for sending a value of an RIV, it may be further considered that a value of t0 is 0. Optionally, in the descriptions, in all formulas of the present invention, the value of t0 may be replaced with 0. This is not limited in the present invention.

Figure 5:
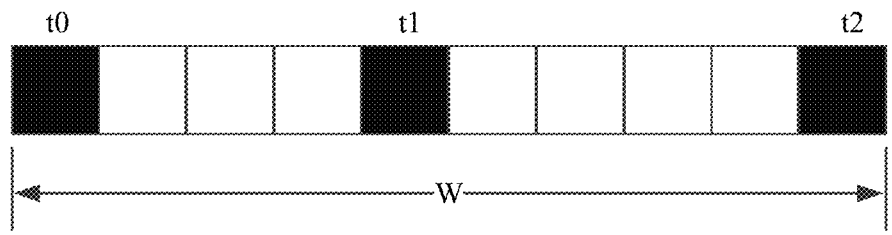
FIG. 5 is a schematic diagram of a position of a third time domain resource according to this application.

In a possible implementation, the third time domain resource is a start time domain resource in a first resource set; the first resource set is a resource set including the third time domain resource, the first time domain resource, and the second time domain resource; and a size of the first resource set is configured by using signaling or is predefined. As shown in FIG. 5, W is the size of the first resource set, and t0 may be the start time domain resource in the first resource set, or may be the third time domain resource. In this case, the transmitting device sends the first resource indication information at t0.

In another possible implementation, the first time domain resource and/or the second time domain resource are/is resources/a resource occupied by data sent by the transmitting device; or the first time domain resource and/or the second time domain resource are/is reserved resources/a reserved resource selected by the transmitting device; or the first time domain resource and/or the second time domain resource are/is used to assist a receiving device in determining a transmission resource.

The following specifically describes a technical solution of jointly determining the first resource indication information by using the position of the first time domain resource and the position of the second time domain resource in this embodiment of this application.

In a possible implementation, the first resource indication information is jointly determined by using the position of the first time domain resource, the position of the second time domain resource, and the size of the first resource set. The first resource indication information may be a resource indication value (RIV).

In an example, the RIV is determined by using the time interval between the first time domain resource and the third time domain resource, the time interval between the second time domain resource and the first time domain resource, and the size of the first resource set. Similarly, slots used by t0, t1, and t2 cannot be the same. This is because t1 cannot occupy the slot used by t0 (t1 cannot overlap with t0) or the last slot. If the last slot is occupied by t1, t2 overlaps with t1. As shown in FIG. 5, assuming that the time interval between t1 and t0 is L, that is, L=t1−t0, $1 \leq L \leq W-2$, where W is the size of the first resource set. In this case, the RIV may satisfy the following formula (1) or formula (2):

$$(W-2)*(L-1)+(t2-t1)+C \qquad \text{Formula (1)}$$

$$(W-2)*(W-L-1)+(W-3-(t2-t1))+C \qquad \text{Formula (2)}$$

C is an integer, and may be 0, 1, 30, 31, 32, or the like; or may be an integer constant or a variable. This is not specifically limited in this application. Optionally, a value of C may be W, W−1, or W−2. This is not limited in the present invention. Optionally, a definition of the value of C is not limited herein, and may be applicable to all sub-embodiments of the present invention.

In a possible embodiment, the first resource indication information may be determined based on a first threshold and a difference between the first time domain resource and the third time domain resource.

For example, if the difference between the first time domain resource and the third time domain resource is less than or equal to the first threshold, the first resource indication information satisfies the foregoing formula (1). If the difference between the first time domain resource and the third time domain resource is greater than the first threshold, the first resource indication information satisfies the foregoing formula (2).

The first threshold is related to the size of the first resource set. For example, the first threshold may be (W−2)/2.

In this case, the RIV may further be described by using the following content:

If$((t1-t0)-1) \leq f(W-2)/2)$ $RIV=(W-2)*(L-1)+(t2-t1)+C$

Else $RIV=(W-2)*(W-L-1)+(W-3-(t2-t1))+C$

In another example, the RIV is determined by using the time interval between the first time domain resource and the third time domain resource and/or the time interval between the second time domain resource and the first time domain resource. For example, W in the foregoing formula (1) and formula (2) may be set to 32, that is, the size of the first resource set is set to 32. In this case, the RIV may satisfy the following formula (3) or formula (4):

$$30*(t1-t0-1)+(t2-t1)+C \qquad \text{Formula (3)}$$

$$30*(31-t1+t0)+(29-(t2-t1))+C \qquad \text{Formula (4)}$$

In a possible embodiment, the first resource indication information may be determined based on a first threshold and a difference between the first time domain resource and the third time domain resource.

For example, if the difference between the first time domain resource and the third time domain resource is less than or equal to the first threshold, the first resource indication information satisfies the foregoing formula (3). If the difference between the first time domain resource and the third time domain resource is greater than the first threshold, the first resource indication information satisfies the foregoing formula (4).

In this case, because W is set to 32, the first threshold may be 15. In this case, the RIV may further be described by using the following content:

$$\text{If}((t1-t0)-1) \leq 15$$

$$RIV=30*(t1-t0-1)+(t2-t1)+C$$

Else $$RIV=30*(31-t1+t0)+(29-(t2-t1))+C$$

It should be understood that the first resource indication information in this embodiment of this application may be the foregoing value of the RIV, or may be RIV−C.

In another possible implementation, if the value of the first resource indication information is a third value, indication information of the first time domain resource and the second time domain resource in the first resource indication information is invalid information, or the first time domain resource and the second time domain resource are invalid resources; or if the value of the first resource indication information is a fourth value, the first time domain resource is a valid resource and the second time domain resource is an invalid resource, or indication information of the first time domain resource in the first resource indication information is valid information, and indication information of the second time domain resource in the first resource indication information is invalid information; or if the value of the first resource indication information is a fifth value, the first time domain resource and the second time domain resource are valid resources, or indication information of the first time domain resource and indication information of the second time domain resource in the first resource indication information are valid information. The third value, the fourth value, and the fifth value are different values. The third value is a single value, the fourth value is 31 different values, and the fifth value is 465 different values.

In an example, the third value is 0, the fourth value is 31 different values from 1 to 31, and the fifth value is 465 different values greater than or equal to 32.

For example, when RIV=0, it indicates that the first time domain resource and the second time domain resource are invalid resources, or the indication information of the first time domain resource and the indication information of the second time domain resource in the first resource indication information are invalid information.

When the value of the RIV falls within [1, 31], it indicates that the first time domain resource is a valid resource and the second time domain resource is an invalid resource; or the indication information of the first time domain resource in the first resource indication information is valid information, and the indication information of the second time domain resource in the first resource indication information is invalid information.

When the value of the RIV falls within [32, 465+32], it indicates that the first time domain resource and the second time domain resource are valid resources; or the indication information of the first time domain resource and the indication information of the second time domain resource in the first resource indication information are valid information.

For another example, the third value is greater than 464, the fourth value is 31 different values greater than 464, and the fifth value is 465 different values from 0 to 464.

For example, when the value of the RIV is 465, it indicates that the first time domain resource and the second time domain resource are invalid resources, or the indication information of the first time domain resource and the indication information of the second time domain resource in the first resource indication information are invalid information.

When the value of the RIV falls within [465, 465+32], it indicates that the first time domain resource is a valid resource and the second time domain resource is an invalid resource; or the indication information of the first time domain resource in the first resource indication information is valid information, and the indication information of the second time domain resource in the first resource indication information is invalid information.

When the value of the RIV falls within [0, 465], it indicates that the first time domain resource and the second time domain resource are valid resources; or the indication information of the first time domain resource and the indication information of the second time domain resource in the first resource indication information are valid information.

Figure 6:
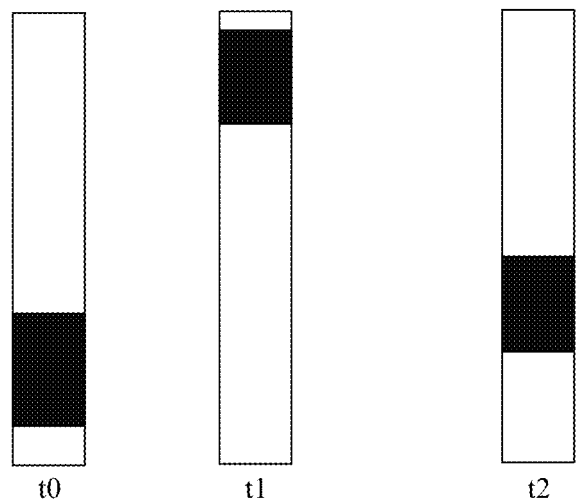
FIG. 6 is a schematic diagram of frequency domain positions of a first time domain resource, a second time domain resource, and a third time domain resource according to this application.

In a possible implementation, the transmitting device may further send second resource indication information on the third time domain resource. As shown in FIG. 6, the second resource indication information may be used to indicate a frequency domain starting position and a frequency domain resource size, on the third time domain resource, of first data sent by the transmitting device (as indicated by a black part of a slot t0 in FIG. 6); and/or the second resource indication information may further be used to indicate a frequency domain starting position and a frequency domain resource size, on the first time domain resource, of the first data sent by the transmitting device (as indicated by a black part of a slot t1 in FIG. 6); and/or the second resource indication information may further be used to indicate a frequency domain starting position and a frequency domain resource size, on the second time domain resource, of the first data sent by the transmitting device (as indicated by a black part of a slot t2 in FIG. 6).

In another possible implementation, the transmitting device may further send third indication information on the third time domain resource, where the third indication information is used to indicate that a time domain reference point of the first resource indication information is a time domain resource used by the transmitting device to send the first data. The third indication information may be indicated by using an NDI field and/or an RV field. An RV indication sequence is predefined. For example, a sixth value, a seventh value, and an eighth value may be respectively indicated in a sequence of {0, 2, 3}.

Figure 7:
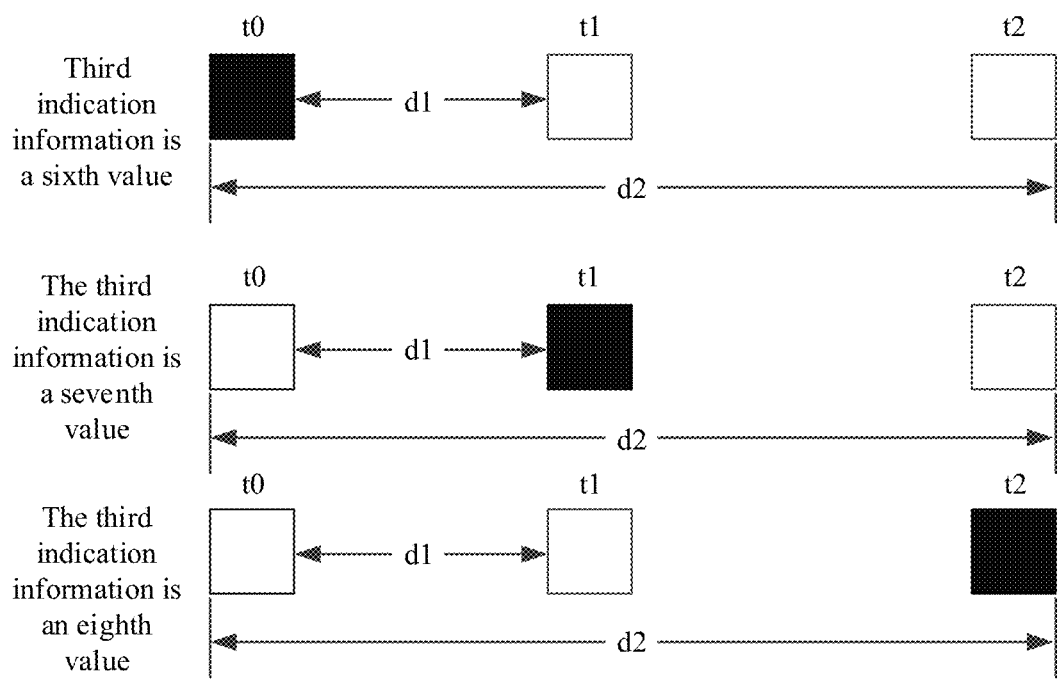
FIG. 7 is a schematic diagram of positions of a first time domain resource and a second time domain resource according to this application.

As shown in FIG. 7, t0 is a position of the third time domain resource, d1 is the interval between the first time domain resource and the third time domain resource, and d2 is the interval between the second time domain resource and the third time domain resource. A black rectangle is the time domain resource used by the transmitting device to send the first data. In other words, the black rectangle is the time domain reference point of the first resource indication information.

If the third indication information is set to the sixth value, the time domain reference point is t0, the position t1 of the first time domain resource is (t0+d1), and the position t2 of the second time domain resource is (t0+d2). The sixth value may be NDI=Y and RV=0.

If the third indication information is set to the seventh value, the time domain reference point is t1, the first time domain resource is indicated as the foregoing third time domain resource, the position t0 of the first time domain resource is (t0−d1), and the position t2 of the second time domain resource is (t0+d2−d1). The seventh value may be NDI=Y and RV=2.

If the third indication information is set to the eighth value, the time domain reference point is t2, the position of the first time domain resource is indicated as the foregoing third time domain resource, the position t0 of the first time domain resource is (t0−d2), the position of the second time domain resource is indicated as the position of the first time domain resource, and the position t2 of the second time domain resource is (t0+d1−d2). The eighth value may be NDI=Y and RV=3.

Optionally, when the NDI occupies one bit, Y may be set to 0 or 1. When the NDI occupies two bits, Y may be any one of 0, 1, 2, and 3.

In still another possible implementation, the transmitting device may further send fourth indication information on the third time domain resource. The fourth indication information is used to indicate that a time domain reference point of the first resource indication information is the third time domain resource. The third indication information may be indicated by using an NDI field and/or an RV field. An RV indication sequence is predefined. For example, a ninth value, a tenth value, and an eleventh value may be respectively indicated in a sequence of {0, 2, 3}.

Figure 8:
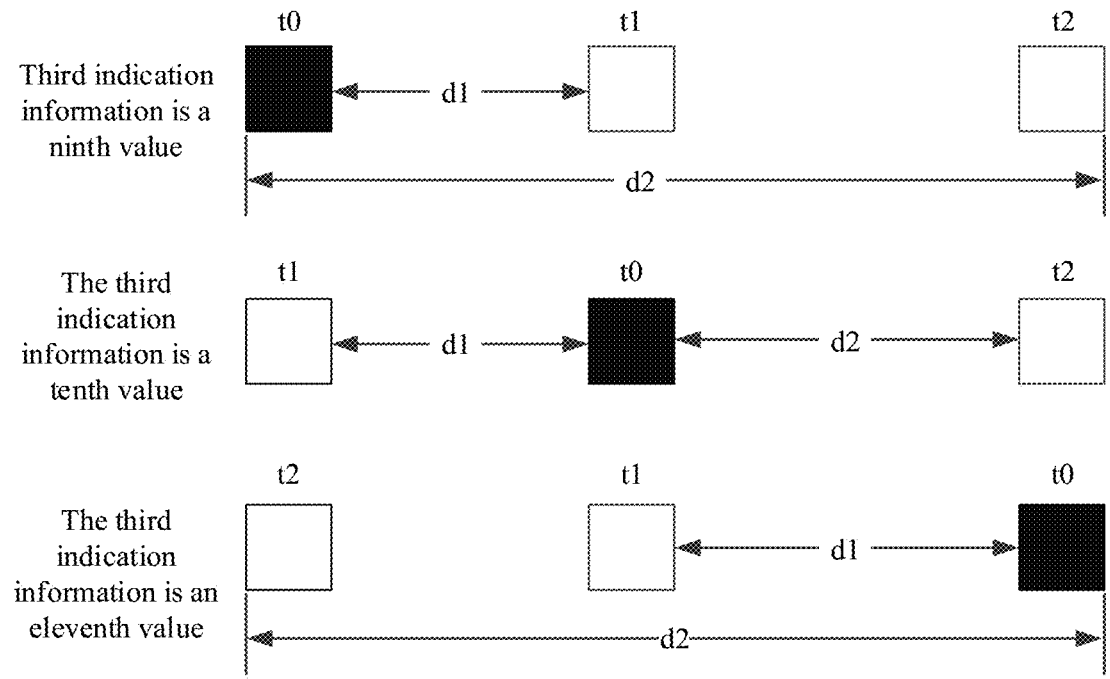
FIG. 8 is a schematic diagram of positions of a first time domain resource and a second time domain resource according to this application.

As shown in FIG. 8, t0 is a position of the third time domain resource, and is the time domain reference point of the first resource indication information, d1 is the interval between the first time domain resource and the third time domain resource, and d2 is the interval between the second time domain resource and the third time domain resource.

If the fourth indication information is set to the ninth value, the position t1 of the first time domain resource is (t0+d1) and the position t2 of the second time domain resource is (t0+d2). The ninth value may be NDI=Y and RV=0.

If the fourth indication information is set to the tenth value, the position t1 of the first time domain resource is (t0−d1), the position t2 of the second time domain resource is (t0+d2), and t0 is the position of the third time domain resource. The tenth value may be NDI=Y and RV=0.

If the fourth indication information is set to the eleventh value, the position t1 of the first time domain resource is (t0−d1), the position t2 of the second time domain resource is (t0−d2), and t0 is the position of the third time domain resource. The eleventh value may be NDI=Y and RV=0.

It should be noted that, in this embodiment of this application, the first resource indication information, the second resource indication information, the third indication information, and the fourth indication information are indicated by using sidelink control information.

Step 403: The receiving device determines, based on the resource indication information and the size of the first resource set, a position of the first time domain resource in the first resource set and a position of the second time domain resource in the first resource set.

The first resource set is the resource set including the third time domain resource, the first time domain resource, and the second time domain resource. The size of the first resource set is configured by using signaling or predefined.

The following specifically describes a technical solution of determining the position of the first time domain resource and the position of the second time domain resource based on the resource indication information in this embodiment of this application.

In a possible implementation, the resource indication information includes the first resource indication information; the first resource indication information is used to indicate the position of the first time domain resource and the position of the second time domain resource; and the first resource indication information is jointly determined by using the position of the first time domain resource and the position of the second time domain resource.

The receiving device determines the time interval between the first time domain resource and the third time domain resource and the time interval between the second time domain resource and the first time domain resource based on the first resource indication information and the size of the first resource set. The receiving device further determines the position of the first time domain resource in the first resource set and the position of the second time domain resource in the first resource set based on the time interval between the first time domain resource and the third time domain resource and the time interval between the second time domain resource and the first time domain resource.

In an example, the time interval between the first time domain resource and the third time domain resource, and the time interval between the second time domain resource and the first time domain resource may be determined by using the following formulas:

$$a = f((RIV-C)/(W-2)) + 1 \quad \text{Formula (5)}$$

$$b = (RIV-C) \bmod (W-2) \quad \text{Formula (6)}$$

$$L = W - a \quad \text{Formula (7)}$$

$$O = W - 3 - b = t2 - t0 - L \quad \text{Formula (8)}$$

$$L = a \quad \text{Formula (9)}$$

$$O = b = t2 - t0 - L \quad \text{Formula (10)}$$

W is the size of the first resource set; t0 is the position of the third time domain resource; t1 is the position of the first time domain resource; t2 is the position of the second time domain resource; L is the time interval between the first time domain resource and the third time domain resource, that is, t1−t0; the time interval between the second time domain resource and the third time domain resource may be calculated by using O, that is, t2−t0=O+L; RIV is the value of the first resource indication information; and C is a constant.

In a possible embodiment, the time interval between the first time domain resource and the third time domain resource and the time interval between the second time domain resource and the first time domain resource may be determined based on a difference between the size W of the first resource set and the value of the first resource indication information.

For example, if the difference between the size of the first resource set and the value of the first resource indication information is less than or equal to a second threshold, the time interval between the first time domain resource and the third time domain resource satisfies the foregoing formula (7), and the time interval between the second time domain resource and the first time domain resource satisfies the foregoing formula (8).

If the difference between the size of the first resource set and the value of the first resource indication information is greater than a second threshold, the time interval between the first time domain resource and the third time domain resource satisfies the foregoing formula (9), and the time interval between the second time domain resource and the first time domain resource satisfies the foregoing formula (10).

The second threshold is related to the size of the first resource set. For example, the second threshold may be W−2. In this case, manners of determining the time interval between the first time domain resource and the third time domain resource and determining the time interval between the second time domain resource and the third time domain resource may be described as follows:

$$a = f((RIV-C)/W-2)+1;$$

$$b = (RIV-C)\bmod(W-2);$$

$$\text{If}(a+b)>(W-2)$$

$$L = W-a$$

$$O = W-3-b = t2-t0-L$$

Else $$L = a$$

$$O = b$$

In another example, W in the formula (5) to the formula (10) may be set to 32, that is, the size of the first resource set is set to 32. The time interval between the first time domain resource and the third time domain resource, and the time interval between the second time domain resource and the first time domain resource are determined by using the following formulas:

$$a = f((RIV-C)/30)+1 \quad \text{Formula (11)}$$

$$b = (RIV-C)\bmod 30 \quad \text{Formula (12)}$$

$$RIV-C = 30*(L-1)+O \quad \text{Formula (13)}$$

$$RIV-C = 30*(29-L)+(29-O) \quad \text{Formula (14)}$$

W is the size of the first resource set; t0 is the position of the third time domain resource; t1 is the position of the first time domain resource; t2 is the position of the second time domain resource; L is the time interval between the first time domain resource and the third time domain resource, that is, t1−t0; the time interval between the second time domain resource and the third time domain resource is t2−t0=O+L; RIV is the value of the first resource indication information; and C is a constant.

In a possible embodiment, the time interval between the first time domain resource and the third time domain resource and the time interval between the second time domain resource and the first time domain resource may be determined based on a difference between the size W of the first resource set and the value of the first resource indication information.

For example, if the difference between the size of the first resource set and the value of the first resource indication information is less than or equal to a second threshold, the time interval between the first time domain resource and the third time domain resource, and the time interval between the second time domain resource and the first time domain resource satisfy the foregoing formula (13).

If the difference between the size of the first resource set and the value of the first resource indication information is greater than a second threshold, the time interval between the first time domain resource and the third time domain resource, and the time interval between the second time domain resource and the first time domain resource satisfy the foregoing formula (14).

In this embodiment of this application, a method for determining the time interval between the first time domain resource and the third time domain resource and the time interval between the second time domain resource and the first time domain resource may further be described as follows:

$$L = t1-t0,\ O = t2-t1-1,\ 0 \le O < W-2,\ 1 \le L \le W-2;$$

$$\text{If}(L-1) \le \text{floor}((W-2)/2)$$

$$RIV-C = (W-2)*(L-1)+O$$

Else $$RIV-C = (W-2)*(W-L-1)+(W-3-O)$$

$$t0 = t1-L$$

$$t2 = t1+O+1$$

In a possible implementation, the resource indication information further includes second resource indication information. The second resource indication information may be used to indicate a frequency domain starting position and a frequency domain resource size, on the third time domain resource, of first data sent by the transmitting device; and/or the second resource indication information may further be used to indicate a frequency domain starting position and a frequency domain resource size, on the first time domain resource, of the first data sent by the transmitting device; and/or the second resource indication information may further be used to indicate a frequency domain starting position and a frequency domain resource size, on the second time domain resource, of the first data sent by the transmitting device.

In another possible implementation, the resource indication information further includes third indication information, where the third indication information is used to indicate that a time domain reference point of the first resource indication information is a time domain resource used by the transmitting device to send the first data. The third indication information may be indicated by using an NDI field and/or an RV field.

In still another possible implementation, the resource indication information further includes fourth indication information, where the fourth indication information is used to indicate that a time domain reference point of the first resource indication information is the third time domain resource. The fourth indication information may be indicated by using an NDI field and/or an RV field.

It should be understood that the second resource indication information, the third indication information, and the fourth indication information are sent by the transmitting device. Related content is already reflected in the embodiment on a side of the transmitting device, and repeated content is not described herein again.

The foregoing describes in detail the resource indication and determining methods in the embodiments of this application with reference to FIG. 1 to FIG. 8. The following describes in detail resource indication and determining apparatuses in the embodiments of this application with reference to FIG. 9 to FIG. 11.

Figure 9:
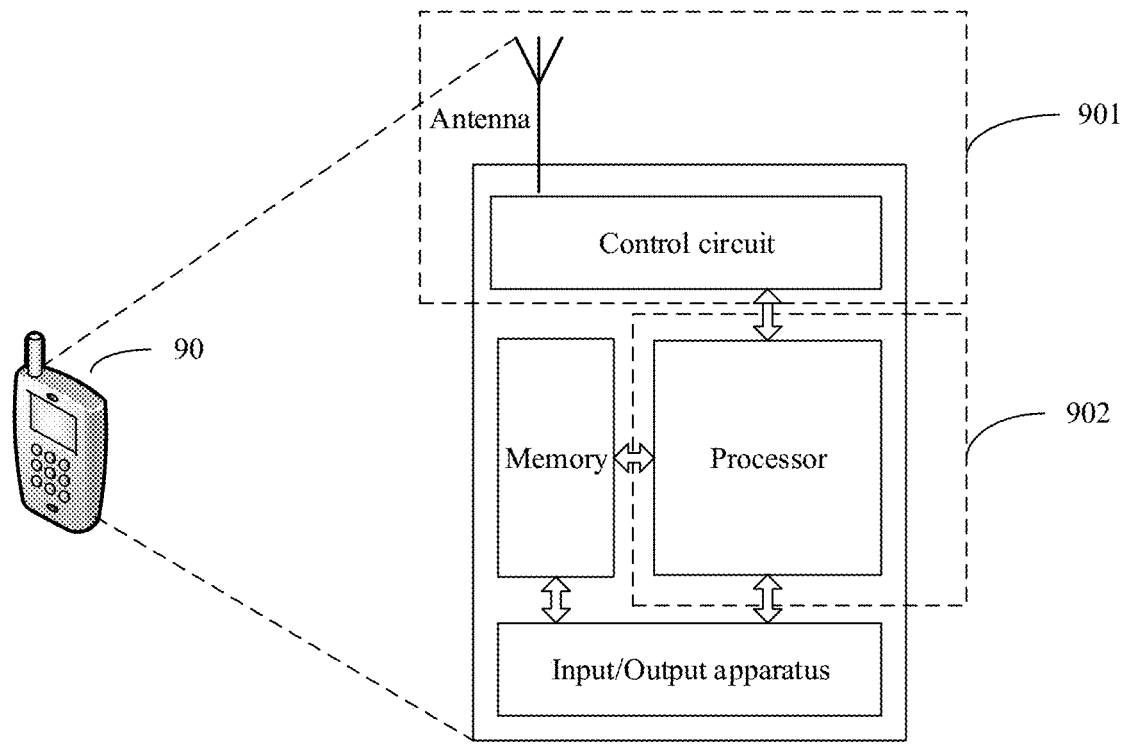
FIG. 9 is a schematic diagram of a terminal device according to this application.

FIG. 9 is a schematic structural diagram of a terminal device according to an embodiment of this application. The terminal device is usable in the system shown in FIG. 3, and performs a function of the transmitting device or the receiving device in the foregoing method embodiments. For ease of description, FIG. 9 shows only main components of the terminal device. As shown in FIG. 9, the terminal device 90 includes a processor, a memory, a control circuit, an antenna, and an input/output apparatus. The processor is mainly configured to: process a communications protocol and communications data, control the entire terminal device, execute a software program, and process data of the software program. For example, the processor is configured to support the terminal device in performing the action described in the foregoing method embodiments, for example, determining the positions of the first time domain resource and the second time domain resource. The memory is mainly configured to store the software program and the data, for example, store the first resource indication information in the foregoing embodiments. The control circuit is mainly configured to perform conversion between a baseband signal and a radio frequency signal, and process the radio frequency signal. A combination of the control circuit and the antenna may also be referred to as a transceiver and is mainly configured to send and receive a radio frequency signal in a form of an electromagnetic wave. The input/output apparatus such as a touchscreen, a display, or a keyboard is mainly configured to: receive data entered by a user, and output data to the user.

After the terminal device is powered on, the processor may read a software program in a storage unit, explain and execute instructions of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communications data. The central processing unit is mainly configured to: control the entire terminal device, execute the software program, and process the data of the software program. Functions of the baseband processor and the central processing unit may be integrated into the processor in FIG. 9. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communications data may be embedded into the processor, or may be stored in a storage unit in a form of a software program. The processor executes the software program to implement a baseband processing function.

In this embodiment of this application, the antenna and the control circuit that have sending and receiving functions may be considered as a transceiver unit 901 of the terminal device 90. For example, the transceiver unit 901 is configured to support the terminal device in performing the receiving function and the sending function described in FIG. 4. The processor having a processing function is considered as a processing unit 902 of the terminal device 90. As shown in FIG. 9, the terminal device 90 includes the transceiver unit 901 and the processing unit 902. The transceiver unit may also be referred to as a transceiver, a transceiver machine, a transceiver apparatus, or the like. Optionally, a component configured to implement the receiving function in the transceiver unit 901 may be considered as a receiving unit, and a component configured to implement the sending function in the transceiver unit 901 may be considered as a sending unit. In other words, the transceiver unit 901 includes the receiving unit and the sending unit. The receiving unit may also be referred to as a receiver, an input port, a receiver circuit, or the like. The sending unit may be referred to as a transmitter machine, a transmitter, a transmitter circuit, or the like.

The processor 902 may be configured to execute instructions stored in the memory, to control the transceiver unit 901 to receive a signal and/or send a signal, to complete the function of the transmitting device or the receiving device in the foregoing method embodiments. In an implementation, it may be considered that the function of the transceiver unit 901 is implemented through a transceiver circuit or a special purpose transceiver chip.

Figure 10:
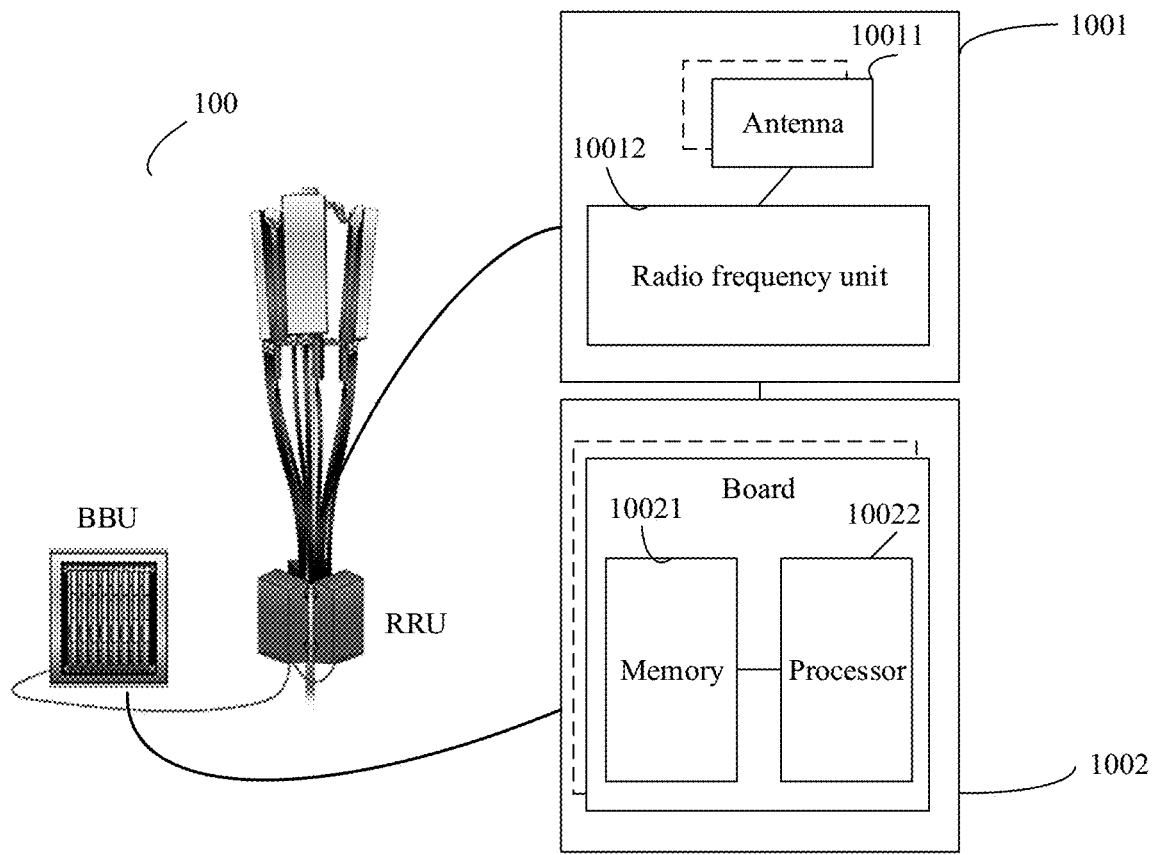
FIG. 10 is a schematic diagram of a network device according to this application.

FIG. 10 is a schematic structural diagram of a network device according to an embodiment of this application, for example, may be a schematic structural diagram of a base station. As shown in FIG. 10, the base station is usable in the system shown in FIG. 3, and performs a function of the transmitting device or the receiving device in the foregoing method embodiment. The base station 10 may include one or more radio frequency units such as a remote radio unit (RRU) 1001 and one or more baseband units (BBU) (which may also be referred to as digital units (DU)) 1002. The RRU 1001 may be referred to as a transceiver unit, a transceiver machine, a transceiver circuit, a transceiver, or the like, and may include at least one antenna 10011 and a radio frequency unit 10012. The RRU 10010 is mainly configured to: send and receive a radio frequency signal and perform conversion between a radio frequency signal and a baseband signal. For example, the RRU 10010 is configured to send the first resource indication information in the foregoing embodiment to the receiving device. The BBU 1002 is mainly configured to perform baseband processing, control the base station, and the like. The RRU 1001 and the BBU 1002 may be physically disposed together, or may be physically disposed separately, namely, a distributed base station.

The BBU 1002 is a control center of the base station, may also be referred to as a processing unit, and is mainly configured to complete baseband processing functions such as channel coding, multiplexing, modulation, and spectrum spreading. For example, the BBU (the processing unit) 1002 may be configured to control the base station to perform the operation procedure related to the receiving device or the transmitting device in the foregoing method embodiments.

In an example, the BBU 1002 may include one or more boards. A plurality of boards may jointly support a radio access network (such as an LTE network) of a single access standard, or may separately support radio access networks (such as an LTE network, a 10G network, and another network) of different access standards. The BBU 1002 may further include a memory 10021 and a processor 10022, and the memory 10021 is configured to store necessary instructions and data. The processor 10022 is configured to control the base station to perform necessary actions. For example, the processor 10022 is configured to control the base station to perform the operation procedure related to the base station in the foregoing method embodiments. The memory 10021 and the processor 10022 may serve one or more boards. In other words, a memory and a processor may be independently disposed on each board. Alternatively, a plurality of boards may share a same memory and a same processor. In addition, a necessary circuit may further be disposed on each board.

Figure 11:
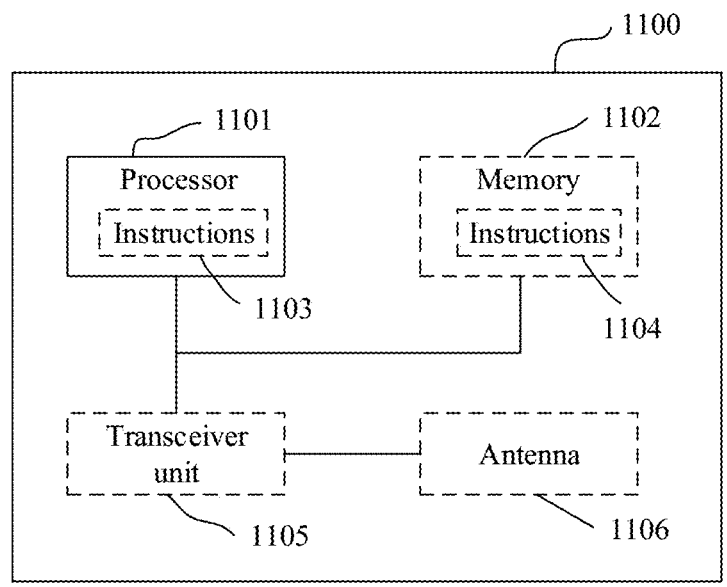
FIG. 11 is a schematic diagram of a communications apparatus according to this application.

FIG. 11 is a schematic structural diagram of a communications apparatus 1100. The apparatus 1100 may be configured to implement the methods described in the foregoing method embodiments. For details, refer to the descriptions in the foregoing method embodiments. The communications apparatus 1100 may be a chip, a network device (such as a base station), a terminal device, another network device, or the like.

The communications apparatus 1100 includes one or more processors 1101. The processor 1101 may be a general purpose processor, a special purpose processor, or the like. For example, the processor 1101 may be a baseband processor or a central processing unit. The baseband processor may be configured to process a communications protocol and communications data. The central processing unit may be configured to control the communications apparatus (for example, a base station, a terminal, or a chip), execute a software program, and process data of the software program. The communications apparatus may include a transceiver unit that is configured to output (send) and input (receive) a signal. For example, the communications apparatus may be a chip, and the transceiver unit may be an input and/or output circuit or a communications interface of the chip. The chip may be used for a terminal, abase station, or another network device. For another example, the communications apparatus may be a terminal, a base station, or another network device, and the transceiver unit may be a transceiver, a radio frequency chip, or the like.

The communications apparatus 1100 includes one or more processors 1101. The one or more processors 1101 may implement the method of the receiving device or the transmitting device in the embodiment shown in FIG. 4.

In a possible design, the communications apparatus 1100 includes a means configured to determine the first resource indication information. A function of the means of determining the first resource indication information may be implemented by using the one or more processors. For example, the first resource indication information may be determined by using one or more processors. For sending the first resource indication information through a transceiver, an input/output circuit, or an interface of a chip, refer to related descriptions in the foregoing method embodiments.

In a possible design, the communications apparatus 1100 includes a means configured to determine the positions of the first time domain resource and the second time domain resource. A function of the means of determining the positions of the first time domain resource and the second time domain resource may be implemented by using the one or more processors. For example, the positions of the first time domain resource and the second time domain resource may be determined by using the one or more processors. For receiving the resource indication information through a transceiver, an input/output circuit, or an interface of a chip, refer to related descriptions in the foregoing method embodiments.

Optionally, the processor 1101 may further implement another function in addition to implementing the method in the embodiment shown in FIG. 4.

Optionally, in a design, the processor 1101 may execute instructions, so that the communications apparatus 1100 performs the methods described in the foregoing method embodiments. All or a part of the instructions, for example, an instruction 1103, may be stored in the processor. Alternatively, all or a part of the instructions, for example, an instruction 1104, may be stored in the memory 1102 coupled to the processor. Alternatively, the communications apparatus 1100 may be enabled, by using both the instructions 1103 and 1104, to perform the methods described in the foregoing method embodiments.

In another possible design, the communications apparatus 1100 may further include a circuit. The circuit may implement a function of the receiving device or the transmitting device in the foregoing method embodiments.

In still another possible design, the communications apparatus 1100 may include one or more memories 1102. The memory stores an instruction 1104. The instruction may be run on the processor, so that the communications apparatus 1100 performs the methods described in the foregoing method embodiments. Optionally, the memory may further store data. Optionally, the processor may alternatively store instructions and/or data. For example, the one or more memories 1102 may store the resource indication information described in the foregoing embodiment. The processor and the memory may be separately disposed, or may be integrated together.

In still another possible design, the communications apparatus 1100 may further include a transceiver unit 1105 and an antenna 1106. The processor 1101 may be referred to as a processing unit, and controls the communications apparatus (a terminal or a base station). The transceiver unit 1105 may be referred to as a transceiver machine, a transceiver circuit, a transceiver, or the like, and is configured to implement sending and receiving functions of the communications apparatus through the antenna 11011.

This application further provides a communications system, including the foregoing one or more network devices and one or more terminal devices.

It should be noted that the processor in the embodiments of this application may be an integrated circuit chip, and has a signal processing capability. In an implementation process, the steps in the foregoing method embodiments can be implemented by using a hardware integrated logical circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general purpose processor may be a microprocessor, any conventional processor, or the like. The steps of the methods disclosed with reference to the embodiments of this application may be directly executed and completed by a hardware decoding processor, or may be executed and completed by a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example, and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that memories in the system and method described in this specification include but are not limited to the memories and memories of any other proper types.

An embodiment of this application further provides a computer-readable medium. The computer-readable medium stores a computer program. When the computer program is executed by a computer, the resource indication and determining method in any one of the foregoing method embodiments is implemented.

An embodiment of this application further provides a computer program product. When the computer program product is executed by a computer, the resource indication and determining method in any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a high-density digital video disc (DVD)), a semiconductor medium (for example, a solid-state drive (Solid State Disk, SSD)), or the like.

An embodiment of this application further provides a processing apparatus, including a processor and an interface. The processor is configured to perform the resource indication and determining method in any one of the foregoing method embodiments.

It should be understood that the processing apparatus may be a chip. The processor may be implemented by hardware, or may be implemented by software. When the processor is implemented by the hardware, the processor may be a logic circuit, an integrated circuit, or the like. When the processor is implemented by the software, the processor may be a general purpose processor. The general purpose processor is implemented by reading software code stored in a memory. The memory may be integrated into the processor, or may be located outside the processor and exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on only A, and B may be determined based on A and/or other information.

A person of ordinary skill in the art may be aware that, the units and algorithm steps in the examples described with reference to the embodiments disclosed in this specification may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatuses, and methods may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments in this application.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of an instruction or a data structure and is accessible by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared, radio, and microwave, the coaxial cable, optical fiber/cable, twisted pair, DSL, or the wireless technologies such as infrared, radio, and microwave are included in fixation of a medium to which they belong. A disk and a disc used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination shall also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A resource indication method comprising:
   determining, by a transmitting device, a first time domain resource and a second time domain resource; and
   sending, by the transmitting device, first resource indication information on a third time domain resource that is a start time domain resource in a first resource set that comprises the first, second and third time domain resources,
   wherein a size of the first resource set is configured by signaling or is predefined,
   wherein the first resource indication information indicates a position of the first time domain resource and a position of the second time domain resource, and
   wherein a value of the first resource indication information is determined from the size of the first resource set, a difference between the position of the first domain resource and a position of the third time domain resource and a difference between the position of the first time domain resource and the position of the second time domain resource.

2. The method according to claim 1, wherein the first time domain resource and/or the second time domain resource are/is one of the following (a) to (c):
   (a) resources/a resource used by the transmitting device to send data;
   (b) reserved resources/a reserved resource selected by the transmitting device; or
   (c) resources/a resource used to assist a receiving device in determining a transmission resource.

3. The method according to claim 1, wherein sending the first resource indication information on the third time domain resource comprises:

sending, by the transmitting device, the first resource indication information and second resource indication information on the third time domain resource,
wherein the second resource indication information indicates a frequency domain starting position and a frequency domain resource size on at least one of the first, second and/or third time domain resources of first data sent by the transmitting device.

4. A resource determining method comprising:
receiving, by a receiving device, resource indication information on a third time domain resource; and
determining, by the receiving device and based on the resource indication information and a size of a first resource set, a position of a first time domain resource in the first resource set and a position of a second time domain resource in the first resource set,
wherein the first resource set comprises the third time domain resource, the first time domain resource and the second time domain resource,
wherein the size of the first resource set is configured by signaling or predefined,
wherein the resource indication information comprises first resource indication information that indicates positions of the first and second time domain resources, and
wherein a value of the first resource indication information is determined from the size of the first resource set, a difference between the position of the first time domain resource and a position of the third time domain resource and a difference between the positions of the first and second time domain resources.

5. The method according to claim 4, wherein the resource indication information comprises second resource indication information,
wherein the second resource indication information indicates a frequency domain starting position and a frequency domain resource size on at least one of the first, second and/or third time domain resources of first data sent by a transmitting device.

6. The method according to claim 4, wherein the third time domain resource is a start time domain resource in the first resource set.

7. The method according to claim 4, wherein the first time domain resource and/or the second time domain resource are/is one of the following (a) to (c):
(a) resources/a resource used by the transmitting device to send data;
(b) reserved resources/a reserved resource selected by the transmitting device; or
(c) resources/a resource used to assist the receiving device in determining a transmission resource.

8. The method according to claim 4, wherein determining the position of first time domain resource in the first recourse set and the position of the second time domain resource in the first resource set comprises:
determining, by the receiving device, a time interval between the first time domain resource and the third time domain resource and a time interval between the second time domain resource and the first time domain resource based on the resource indication information and the size of the first resource set; and
determining, by the receiving device, the position of the first time domain resource in the first resource set the position of the second time domain resource in the first resource set based on the time interval between the first time domain resource and the third time domain resource and the time interval between the second time domain resource and the first time domain resource.

9. The method according to claim 8, wherein the time interval between the first time domain resource and the third time domain resource and the time interval between the second time domain resource and the first time domain resource satisfy the following formulas:

$$a=f((RIV-C)/(W-2))+1 \text{ and } b=(RIV-C) \bmod W-2); \text{ and}$$

$$L=W-a=t1-t0 \text{ and } O=W-3-b=t2-t0-L; \text{ or } L=a=t1-t0 \text{ and } O=b-t2-t0-L,$$

wherein L is the time interval between the first time domain resource and the third time domain resource,
wherein O is the time interval between the second time domain resource and the first time domain resource,
wherein W is the size of the first resource set, wherein t0 is a position of the third time domain resource,
wherein t1 is the position of the first time domain resource,
wherein t2 is the position of the second time domain resource,
wherein C is an integer, and
wherein RIV is the value of the first resource indication information in the resource indication information.

10. A communication apparatus comprising one or more processors and a memory, wherein the memory is coupled to the one or more processors and stores a computer program which is executed by the one or more processors and cause the communication apparatus implement operations including:
determining a first time domain resource and a second time domain resource; and
sending first resource indication information on a third time domain resource that is a start time domain resource in a first resource set that comprises the first, second and third time domain resources,
wherein a size of the first resource set is configured by signaling or is predefined,
wherein the first resource indication information indicates a position of the first time domain resource and a position of the second time domain resource, and
wherein a value of the first resource indication information is determined from the size of the first resource set, a difference between the position of the first domain resource and a position of the third time domain resource and a difference between the position of the first time domain resource and the position of the second time domain resource.

11. The apparatus according to claim 10, wherein the first time domain resource and/or the second time domain resource are/is one of the following (a) to (c):
(a) resources/a resource used by the apparatus to send data;
(b) reserved resources/a reserved resource selected by the apparatus; or
(c) resources/a resource used to assist a receiving device in determining a transmission resource.

12. The apparatus according to claim 10, wherein the operation of sending the first resource indication information on the third time domain resource comprises:
sending the first resource indication information and second resource indication information on the third time domain resource,
wherein the second resource indication information indicates a frequency domain starting position and a frequency domain resource size on at least one of the first, second and/or third time domain resource of first data sent by the apparatus.

13. A communication apparatus comprising one or more processors and a memory, wherein the memory is coupled to the one or more processors and stores a computer program which is executed by the one or more processors and cause the communication apparatus implement operations including:
   receiving resource indication information on a third time domain resource; and
   determining based on the resource indication information and a size of a first resource set, a position of a first time domain resource in the first resource set and a position of a second time domain resource in the first resource set,
      wherein the first resource set comprises the third time domain resource, the first time domain resource, and the second time domain resource,
      wherein the size of the first resource set is configured by signaling or predefined,
      wherein the resource indication information comprises first resource indication information that indicates positions of the first and second time domain resources, and
      wherein a value of the first resource indication information is determined from the size of the first resource set, a difference between the position of the first time domain resource and a position of the third time domain resource and a difference between the positions of the first and second time domain resources.

14. The communication apparatus according to claim 13, wherein the resource indication information comprises second resource indication information,
   wherein the second resource indication information indicates a frequency domain starting position and a frequency domain resource size on at least one of the first, second and/or third time domain resources of first data sent by a transmitting device.

15. The communication apparatus according to claim 13, wherein the third time domain resource is a start time domain resource in the first resource set.

16. The communication apparatus according to claim 4, wherein the first time domain resource and/or the second time domain resource are/is one of the following (a) to (c):
   (a) resources/a resource used by the transmitting device to send data;
   (b) reserved resources/a reserved resource selected by the transmitting device; or
   (c) resources/a resource used to assist the receiving device in determining a transmission resource.

17. The communication apparatus according to claim 13, wherein the computer program, when executed by the one or more processors, cause the communication apparatus to implement further operations for determining the position of the first time domain resource in the first recourse set and the position of the second time domain resource in the first resource set, wherein the further operations include:
   determining a time interval between the first time domain resource and the third time domain resource and a time interval between the second time domain resource and the first time domain resource based on the resource indication information and the size of the first resource set; and
   determining the position of the first time domain resource in the first resource set the position of the second time domain resource in the first resource set based on the time interval between the first time domain resource and the third time domain resource and the time interval between the second time domain resource and the first time domain resource.

18. The communication apparatus according to claim 17, wherein the time interval between the first time domain resource and the third time domain resource and the time interval between the second time domain resource and the first time domain resource satisfy the following formulas:

$$a = f((RIV-C)/(W-2))+1 \text{ and } b=(RIV-C) \bmod (W-2); \text{ and}$$

$$L=W-a=t1-t0 \text{ and } O=W-3-b=t2-t0-L; \text{ or } L=a=t1-t0 \text{ and } O=b-t2-t0-L,$$

wherein L is the time interval between the first time domain resource and the third time domain resource,
wherein O is the time interval between the second time domain resource and the first time domain resource,
wherein W is the size of the first resource set, wherein t0 is a position of the third time domain resource,
wherein t1 is the position of the first time domain resource,
wherein t2 is the position of the second time domain resource,
wherein C is an integer, and
wherein RIV is the value of the first resource indication information in the resource indication information.

* * * * *